United States Patent
Jong et al.

(10) Patent No.: US 6,518,792 B2
(45) Date of Patent: Feb. 11, 2003

(54) METHOD AND CIRCUITRY FOR A PRE-EMPHASIS SCHEME FOR SINGLE-ENDED CENTER TAPED TERMINATED HIGH SPEED DIGITAL SIGNALING

(75) Inventors: Jyh-Ming Jong, Saratoga; Prabhansu Chakrabarti, Sunnyvale; Leo Yuan, Los Altos, all of CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/879,501

(22) Filed: Jun. 11, 2001

(65) Prior Publication Data

US 2002/0186056 A1 Dec. 12, 2002

(51) Int. Cl.$^7$ ............................................. H03K 19/0175
(52) U.S. Cl. .......................................... 326/87; 326/106
(58) Field of Search .............................. 326/83, 86, 87, 326/105, 106; 375/259

(56) References Cited

U.S. PATENT DOCUMENTS

| 4,604,731 | A | * | 8/1986 | Konishi | ................. | 365/189.05 |
| 5,994,922 | A | * | 11/1999 | Aoki et al. | .................... | 326/87 |
| 6,005,633 | A | | 12/1999 | Kosugi | | |
| 6,362,656 | B2 | * | 3/2002 | Rhee | ........................... | 326/87 |
| 6,393,062 | B1 | | 5/2002 | Furman, et al. | | |
| 6,400,616 | B1 | | 6/2002 | Tamura et al. | | |

FOREIGN PATENT DOCUMENTS

JP         401089816 A   *   4/1989

OTHER PUBLICATIONS

"A Scalable 32Gb/s Parallel Data Transceiver with On–Chip Timing Calibration Circuits", Yang, et al. 2000 IEEE International Solid–State Circuits Conference, Session 15, Paper TP 15.6, pp. 258–259.
"Transmitter Equalization for 4Gb/s Signalling", Dally, et al, IEEE Micro, Jan/Feb 1997, pp. 48–56.
"RS–485–422 Transceivers with Preemphasis for High–Speed, Long–Distance Communication," Maxim Integrated Products, Sunnyvale, CA, Apr. 1999.
"Digital Systems Engineering", William J. Dally and John W. Poulton, Cambridge University Press, 1998, pp. 95–99, 110–111, 145–146, 362–366, 514–522, 526, 529, 565–566.

* cited by examiner

Primary Examiner—Michael Tokar
Assistant Examiner—James H Cho
(74) Attorney, Agent, or Firm—B. Noël Kivlin

(57) ABSTRACT

A method and circuitry for pre-emphasizing transmitted logic signals. The method and circuitry may be applied to single-ended center-taped terminated I/O lines. In one embodiment, a driver circuit may be configured for monitoring the logic values (i.e. logic 0, logic 1, or logic low, logic high) of signals transmitted by the driver circuit. The driver circuit may compare the logic value of a next logic signal to be transmitted with a first previously transmitted signal and a second previously transmitted signal. Pre-emphasis of the next logic signal may occur based on the logic value of the next logic signal to be transmitted as well as the logic values of the first and second logic signals. If the first and second logic signals have the same logic value, and the next logic signal has a different value, the next logic value may be pre-emphasized. If the next logic signal has a logic value that is equivalent to either the first logic signal or the second logic signal, it may be transmitted without pre-emphasis.

28 Claims, 7 Drawing Sheets

| A(n-2) | A(n-1) | A(n) | pre_en | en | Action |
|---|---|---|---|---|---|
| 0 | 0 | 1 | 1 | 1 | Active Pre-Emphasis, Low-to-High Transition |
| 1 | 1 | 0 | 1 | 1 | Active Pre-Emphasis, High-to-Low Transition |
| 1 | 0 | 1 | 1 | 0 | No Pre-Emphasis for Next Transition |
| 0 | 1 | 0 | 1 | 0 | No Pre-Emphasis for Next Transition |
| X | 0 | 0 | 1 | 0 | No Transition, No Pre-Emphasis |
| X | 1 | 1 | 1 | 0 | No Transition, No Pre-Emphasis |
| X | X | X | 0 | 0 | Pre-Emphasis Disabled |

METHOD AND CIRCUITRY FOR A PRE-EMPHASIS SCHEME FOR SINGLE-ENDED CENTER TAPED TERMINATED HIGH SPEED DIGITAL SIGNALING

BACKGROUND OF THE INVENTION

1. Field of the Invention

This invention relates to electronic systems, and more particularly, high-speed digital signaling.

2. Description of the Related Art

Operating speeds of digital systems have increased significantly in recent years. System that can transmit data from a drivers to receivers at data rates of 1 GB/s are becoming commonplace. In order to ensure that transmitted data is properly recovered by a receiver circuit, certain conditions must be met.

Eye patterns are well known in the art of digital signaling. Parameters that define an eye pattern include both setup time and hold time. Eye patterns are often times used to characterize various types of digital I/O links, such as source synchronous lines and links. Source synchronous I/O includes the transmission of a clock signal at the source along with the transmitted data signals. In order for a source synchronous receiver to properly recover transmitted data, the eye pattern must allow for sufficient setup time and hold time with respect to the forwarded clock.

Source synchronous data lines, as well as many other types of high-speed digital signaling links, typically include what are known as center-taped terminated (CTT) I/O buffers. FIG. 1 shows an exemplary CTT I/O buffer. CTT I/O buffer 10 includes a driver circuit 12 and a receiver circuit 19 coupled by transmission line 14. Transmission line 14 is referred to as center-taped terminated due to the presence of pull-up resistor 16 and pull-down resistor 18. These two resistors may be of equal resistance value. The resistance value of these resistors may be chosen to effectively terminate the transmission line, thereby preventing or minimizing reflections and other transmission line effects. However, despite effective termination of the transmission line, factors causing signal degradation may still exist.

Frequency dependent dispersion is one factor that may affect a signal transmitted on a transmission line. Frequency dependent dispersion may result from such factors as skin effect and dielectric loss resulting from the transmission line medium. Frequency dependent dispersion may result in signal edge degradation and amplitude attenuation. These effects may become more acute at GB/s signaling speeds, in part due to the high data rate. Further compounding the problem may be the high frequency content of the signal edges on low-to-high and/or high-to-low transitions.

Frequency dependent dispersion may result in what is known as data dependent jitter. Data dependent jitter may be observed as a frequency dependent timing delay vs. data patterns associated with various frequency components. Data dependent jitter may distort the eye pattern and thereby decrease the valid setup and hold window. Thus, the allowable setup and hold time for transmitted digital signals may be significantly reduced. This may significantly reduce the reliability of high-speed digital signaling operations.

One technique that has been developed to combat frequency dependent dispersion and its resulting data dependent jitter is known as pre-emphasis. Pre-emphasis involves increasing the drive strength of a transmitted digital signal in high-speed digital systems. FIGS. 2A and 2B illustrate the difference between traditional digital signal transmissions and pre-emphasized digital signal transmissions. In FIG. 2A, the signals shown are transmitted with no pre-emphasis. In FIG. 2B, comparative signals are pre-emphasized at each low-to-high or high-to-low transition. As shown here, the pre-emphasis may be strong enough to extend for one entire bit time. If the logic value of the next transmitted signal is the same as the pre-emphasized signal, the driving strength may then be de-emphasized back to normal driving strength. Successive transmissions of the same logic value are typically not pre-emphasized.

While the pre-emphasis of transmitted logic signals as shown in FIG. 2B, there may be significant overhead involved with this technique. While pre-emphasizing on every high-to-low and low-to-high transition may improve the data integrity of transmitted signals, power consumption may be increased significantly. Furthermore, while pre-emphasizing some digital signal transmissions may improve data integrity, the practice of pre-emphasizing on each and every transition may not add a significant improvement to data integrity.

SUMMARY OF THE INVENTION

A method and circuitry for pre-emphasizing transmitted logic signals are provided. The method and circuitry may be applied to single-ended center-taped terminated I/O lines, or other types of signal transmission circuitry/mediums suitable for pre-emphasis. In one embodiment, a driver circuit may be configured for monitoring the logic values (i.e. logic 0, logic 1, or logic low, logic high) of signals transmitted by the driver circuit. The driver circuit may compare the logic value of a next logic signal to be transmitted with a first previously transmitted signal and a second previously transmitted signal. Pre-emphasis of the next logic signal may occur based on the logic value of the next logic signal to be transmitted as well as the logic values of the first and second logic signals. If the first and second logic signals have the same logic value, and the next logic signal has a different value, the next logic value may be pre-emphasized. If the next logic signal has a logic value that is equivalent to either the first logic signal or the second logic signal, it may be transmitted without pre-emphasis.

In one embodiment, a driver circuit includes a monitoring circuit, a comparison circuit, and an output circuit. The monitoring circuit may be configured to monitor the logic values, or states, of the logic signals transmitted by the driver circuit. The comparison circuit may be configured to compare the logic values of the recently transmitted logic signals. The comparison circuit may determine whether the next logic signal to be transmitted is to be pre-emphasized or not. The comparison circuit may also include a pre-emphasis controller. The pre-emphasis controller may be coupled to the output circuit, and may be configured to generate either a first or a second enable signal if the next logic signal is to be transmitted with pre-emphasis. If the next logic signal to be transmitted is a logic high signal (or logic one), and is to be pre-emphasized, a first enable signal may be asserted. Similarly, if the next logic signal to be transmitted is a logic low signal (or logic zero) and is to be pre-emphasized, a second enable circuit may be asserted.

In one embodiment, the output buffer may include a first output buffer and a second output buffer. The first and second output buffers may share a common output. During normal (i.e. no pre-emphasis) signal transmissions, the first output buffer may drive the transmitted logic signals, while the second output buffer may remain inactive. During signal transmissions with pre-emphasis, both the first and second output buffers may be active. Since the first and second output buffers share a common output, activating the second output buffer may provide additional drive strength to the transmitted signal, thereby providing the desired pre-emphasis.

Thus, in various embodiments, the method and circuitry for pre-emphasizing transmitted logic signals may allow for high-speed digital signal transmissions with high data integrity. By pre-emphasizing transmitted logic signals only under certain conditions, a significant savings in power consumption may occur.

BRIEF DESCRIPTION OF THE DRAWINGS

Other aspects of the invention will become apparent upon reading the following detailed description and upon reference to the accompanying drawings in which.

Figure 1:
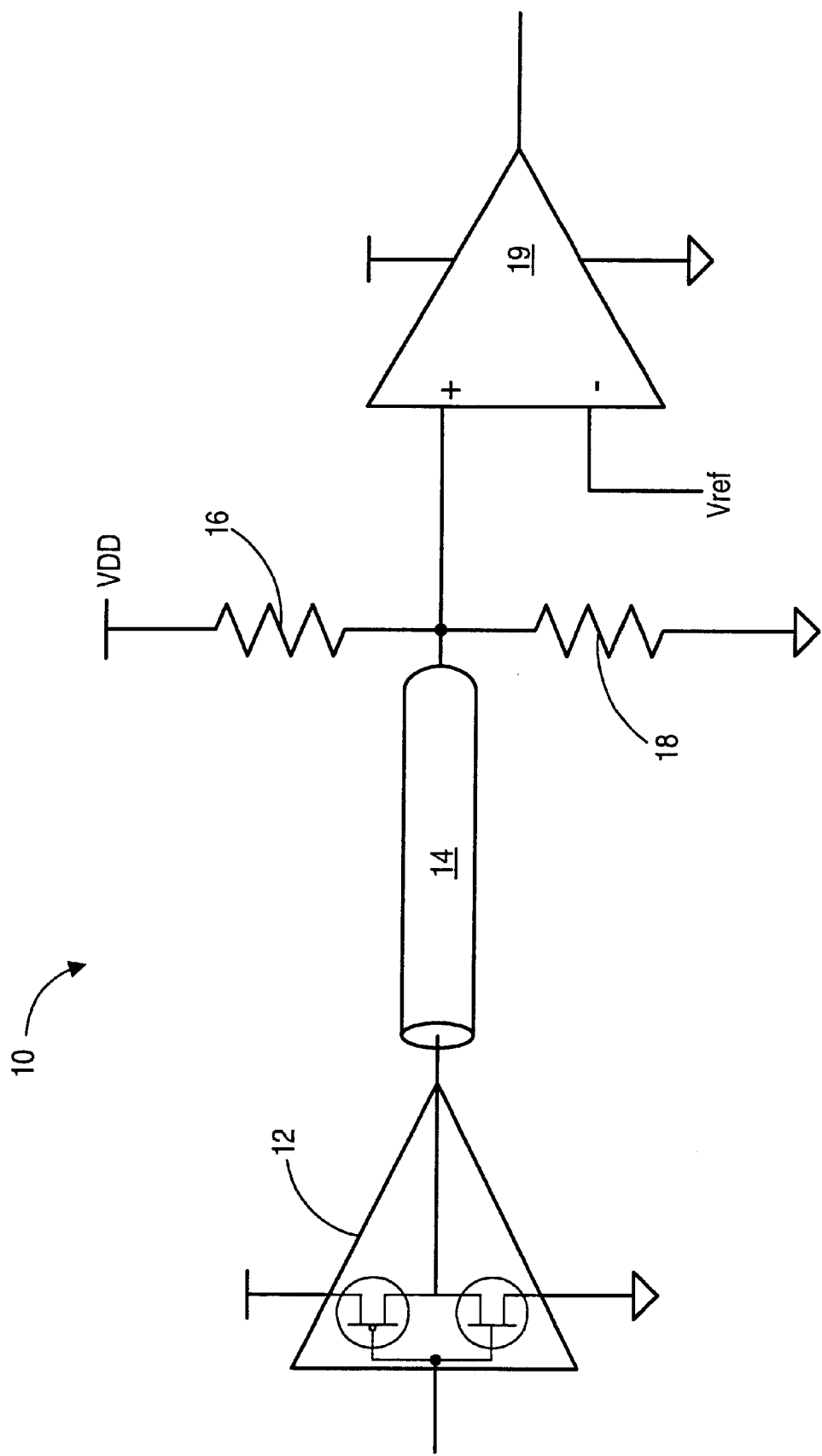
FIG. 1 (Prior Art) is a schematic of one embodiment of a single-ended center-taped terminated I/O buffer.
Figure 2A:
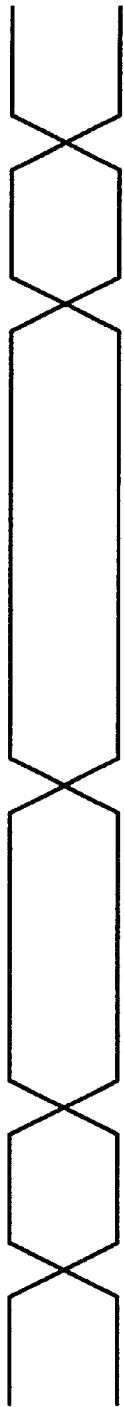
FIG. 2A (Prior Art) is an exemplary timing diagram of digital signal transmissions without pre-emphasis.
Figure 2B:
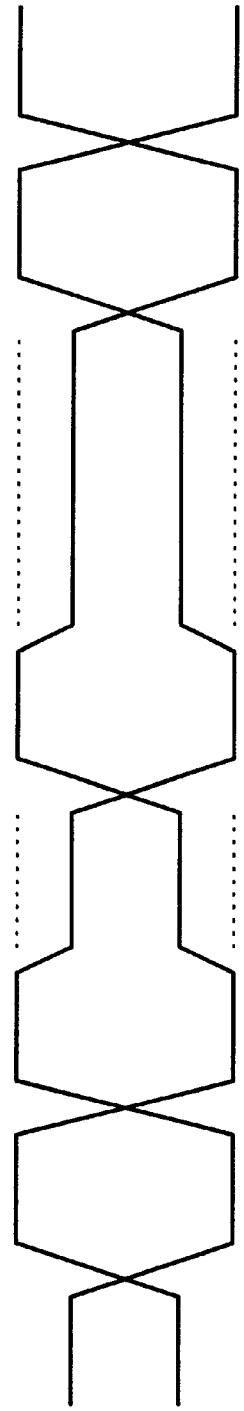
FIG. 2B (Prior Art) is an exemplary timing diagram of digital signal transmissions with pre-emphasis occurring for each signal in which a transition occurs.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figures 3, 4:
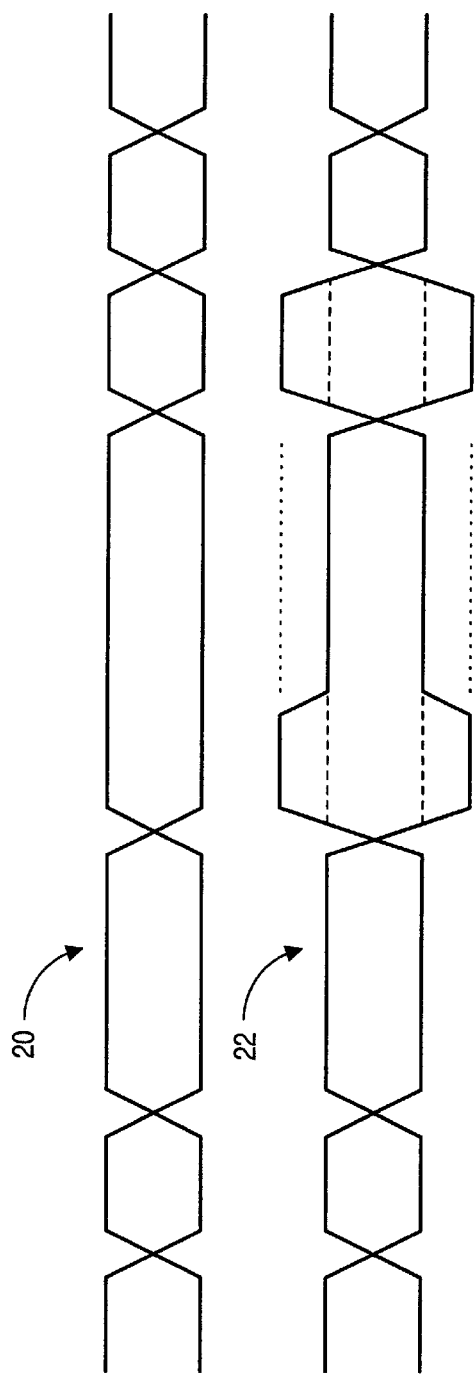
FIG. 3 is an exemplary timing diagram illustrating one embodiment of a method wherein digital signal transitions are conditionally pre-emphasized.
FIG. 4 is a truth table illustrating the conditions under which the signals of the embodiment illustrated in FIG. 3 are pre-emphasized.

Turning now to FIG. 3, an exemplary timing diagram illustrating one embodiment of a method wherein digital signal transitions are conditionally pre-emphasized is shown. A timing diagram of signal transitions without pre-emphasis is included for comparison. Timing pattern 20 illustrates a transmitted data pattern with no pre-emphasis. Timing pattern 22 illustrates a transmitted data pattern with pre-emphasis on selected transitions. As shown in the timing diagram, the first pre-emphasis occurs after two bit-times having a logic value, or state, that is opposite that of the next logic signal to be transmitted. The next logic signal is then transmitted with pre-emphasis. The pre-emphasized signal is transmitted with increased drive strength. Transmissions having increased drive strength may comprise a signal having a greater voltage than normal (no pre-emphasis) transmissions, a greater current than normal transmissions, or both. In the example shown, after the first transmission having pre-emphasis, two additional transmissions having the same logic value as the pre-emphasized transmission are shown. Since the logic state remains unchanged for these two bit times, these two transmissions are normal transmissions. The next transition after these two bit times may be pre-emphasized, since a transition is occurring after two bit times of the same logic value. Thus, in the embodiment shown, pre-emphasis occurs for digital signals when a transition occurs following two or more bit times of the same logic state.

FIG. 4 is a truth table illustrating the conditions under which the signals of the embodiment illustrated in FIG. 3 are pre-emphasized, and further illustrates the conditions under which pre-emphasis occurs. On the left side of the truth table, four conditional inputs are used to determine whether a next digital signal is to be pre-emphasized upon transmission. The conditions are the logic value of a second logic signal, A(n−2), the logic value of a first logic signal, A(n−1), the logic value of the next logic signal to be transmitted, A(n), and the state of a pre-enable signal. The pre-enable signal, when asserted, allows pre-emphasis to occur when certain conditions are met. Pre-emphasis will not occur when the pre-enable signal is de-asserted in this embodiment. The pre-enable signal will be discussed in further detail below. The second logic signal is transmitted prior to the first logic signal, and the first logic signal is transmitted prior to the next logic signal.

For the purposes of this truth table, a logic zero and a logic low are assumed to be equivalent. Furthermore, it is assumed that a logic signal is de-asserted when it is a logic zero or a logic low. Similarly, this example assumes that a logic one and a logic high are equivalent, and that signals are asserted with in a logic one or logic high state. It should be noted that this example is not intended to be limiting to certain logic levels or definitions of what constitutes an asserted or a de-asserted logic signal. On the contrary, the embodiments and examples disclosed herein are illustrative, and that embodiments wherein the definitions of logic zero and/or logic one, logic high and/or logic low, and asserted/de-asserted differ from those discussed herein fall within the scope of this disclosure.

In the first line of the truth table, A(n−2) and A(n−1) are logic zeros, and the next logic signal, A(n), is a logic one. Thus, the conditions are met for pre-emphasis of the next logic signal, which includes a low-to-high transition in this embodiment. In the second line of the truth table, A(n−2) and A(n−1) are logic ones, while A(n) is a logic zero. Thus, the conditions for pre-emphasis of the next logic signal are again met, and thus pre-emphasis occurs on a high-to-low transition. In the third and fourth lines of the truth table, A(n−2) and A(n−1) are of different logic values, and thus the conditions for pre-emphasis are not met, and no pre-emphasis occurs on the next transition. In the fifth and sixth lines of the truth table, the logic values of A(n−1) and A(n) are equivalent, and thus no pre-emphasis occurs during the transmission of A(n), regardless of the logic value of A(n−2). In the last line of the truth table, the pre-enable signal is de-asserted, and thus pre-emphasis does not occur regardless of the state of the first, second, and next logic signals.

Figure 5:
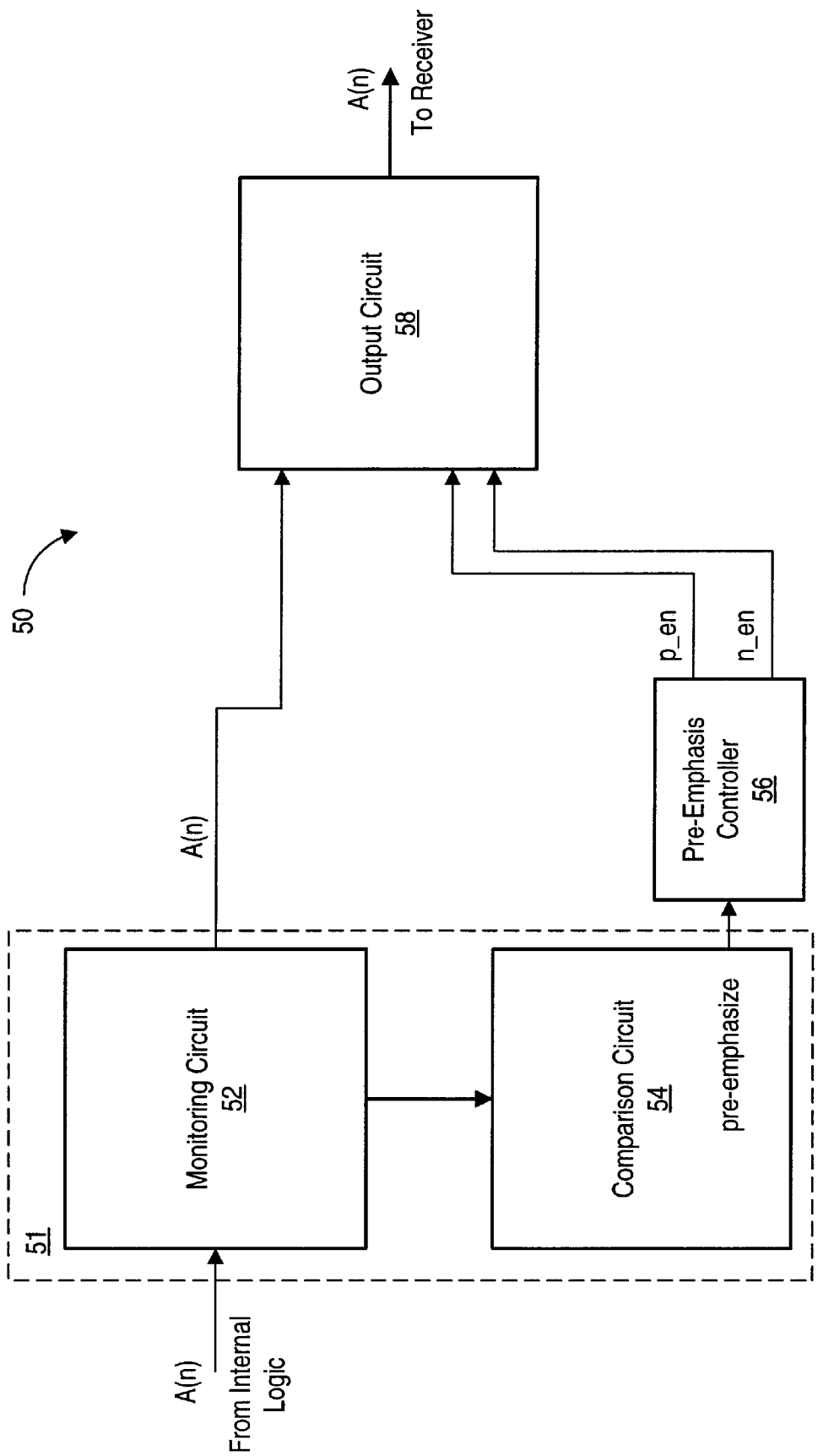
FIG. 5 is a block diagram of one embodiment of a driver circuit having selection logic, a pre-emphasis controller, and an output circuit.

Moving now to FIG. 5, a block diagram of one embodiment of a driver circuit having selection logic, a preemphasis controller, and an output circuit is shown. Driver circuit 50 includes selection logic 51, pre-emphasis controller 56, and output circuit 58. Selection logic includes a monitoring circuit 52 and a comparison circuit 54. Other embodiments that combine the various functional blocks into different form are possible and contemplated. For example, some embodiments may combine the functions performed by the monitoring circuit and comparison circuit into a single block. Similarly, the functions performed by the pre-emphasis controller may be integrated into the comparison circuit in some embodiments. In general, the various functions performed by the functional blocks of this embodiment may be combined in any way that suits a particular implementation.

Selection logic 51 may be configured to drive the next data signal to be transmitted, A(n), to output circuit 58. Similarly, pre-emphasis controller 56 may drive signals to output circuit 58 when pre-emphasis is to occur. In the embodiment shown, the n_en signal indicates and enables pre-emphasis to occur for a high-to-low transition, while the p_en signal indicates an enable pre-emphasis to occur for a low-to-high transition. In some embodiments, the n_en and p_en signals may be generated at different sources. In other embodiments, the n_en and p_en signals may be complements of each other that are originally generated from the same source. Pre-emphasis controller 56 may, in this embodiment, generate one of the enable signals responsive to receiving a pre-emphasis signal from comparison circuit 54. In some embodiments, the pre-emphasis signal may also be used as an enable signal. Pre-emphasis controller 56 may also be configured to receive a pre-enable signal, which, when asserted, may enable pre-emphasis to occur when the proper conditions are met. De-assertion of the pre-enable signal may prevent pre-emphasis from occurring regardless of the conditions.

Monitoring circuit 52 may be configured for monitoring the values of logic signals transmitted by driver circuit 51. In the embodiment shown, monitoring circuit 51 may receive the next logic signal to be transmitted from the internal logic of an integrated circuit. Monitoring circuit may include various storage devices, such as flip-flops or register, for remembering the logic values of the previously transmitted logic signals, as well as remembering the logic value of the next logic signal to be transmitted. The logic values of these logic signals may be forwarded to comparison 53.

Comparison circuit 53 may compare the logic values of two previously transmitted logic signals, A(n−2) and A(n−1), the value of the next logic signal to be transmitted, A(n). It should be noted that A(n−1) is transmitted prior to A(n), and A(n−2) is transmitted prior to A(n). The logic state of the previously transmitted signals may be compared to the state of the next logic signal in order to determine if pre-emphasis is to occur. If the two previously transmitted logic signals are of the same logic value, and the next logic signal is of a different logic value, pre-emphasis may occur during transmission of the next logic signal, in accordance with the truth table illustrated in FIG. 4. If the logic value of the first logic signal, A(n−1), is different from the logic value of the second logic signal, A(n−2), no pre-emphasis occurs, regardless of the logic value of A(n). Similarly, if the logic value of A(n−2) is equal to the logic value of A(n), no pre-emphasis occurs, regardless of the value of A(n−1).

Output circuit 58 may be configured to receive the next logic signal, A(n), and drive the signal to a receiver to which it is coupled. Output circuit 58 may also include circuitry enabling it to pre-emphasize the next logic signal transmission. Pre-emphasis may occur responsive to receiving an enable signal, such as the p_en or n_en signals shown in this embodiment.

Figure 6A:
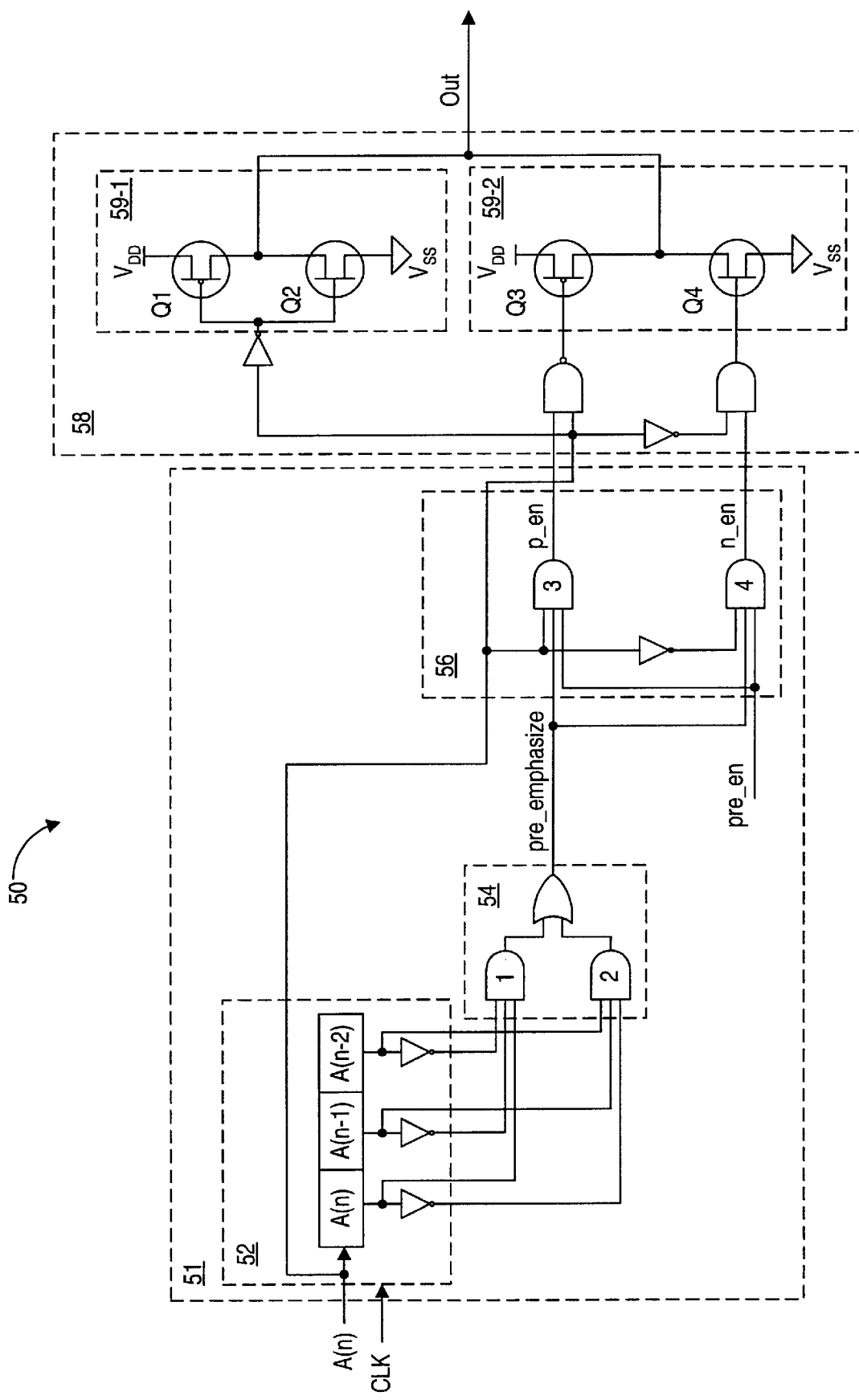
FIG. 6A is a schematic diagram of one embodiment of a driver circuit having selection logic, a pre-emphasis controller, and an output circuit.

Turning now to FIG. 6A, a schematic diagram of one embodiment of a driver circuit having selection logic, a pre-emphasis controller, and an output circuit is shown. The embodiment shown of driver circuit 50 includes selection logic 51 and output circuit 58. In this particular embodiment, selection logic 51 includes monitoring circuit 52, comparison logic 54, and pre-emphasis controller 56. Output circuit 58 includes a first output buffer 59-1 and a second output buffer 59-2.

In the embodiment shown, the next logic signal to be transmitted, A(n), is received by a shift register in monitoring circuit 52. The signal A(n) may also be received by output circuit 58. The shift register of monitoring circuit 52 may be configured to capture the logic value of A(n), as well as the logic values of A(n−1) and A(n−2). With each clock cycle, the logic values in the shift register may shift one place in the shift register. Thus, the shift register of monitoring circuit may be able to store the state of the A(n), A(n−1), and A(n−2) for any clock cycle.

Comparison circuit 54 is configured to determine whether or not pre-emphasis is performed for A(n) based on the values stored in monitoring circuit 52. In the embodiment shown, comparison circuit 54 is configured to generate a pre_emphasize signal based on the inputs to two 3-input AND gates. Assertion of the pre_emphasize signal indicates that A(n) is to be pre-emphasized upon transmission by driver circuit 50. The first of these AND gates ('1') will cause a pre_emphasize signal to be asserted if A(n) is a logic one while both A(n−1) and A(n−2) are logic zeros. The second AND gate ('2') will cause a pre_emphasize signal to be asserted if A(n) is a logic zero while A(n−1) and A(n−2) are logic ones. The pre_emphasize signal, when generated by either AND gate, may propagate through the OR gate shown in drawing to pre-emphasis controller 56.

Pre-emphasis controller 56 may be configured to receive the pre_emphasize signal from comparison logic 54, as well as receiving the next logic signal A(n) and a pre-enable signal, pre_en. When asserted, the pre-enable signal allows pre-emphasis to occur when the appropriate conditions occur. When de-asserted, no pre-emphasis occurs. Pre-emphasis controller 56 is configured to generate one of two possible enable signals, p_en or n_en. The p_en enable signal may be generated if a logic low-to-high (or logic zero to one) transition occurs upon transmitting A(n). The n_en signal may be generated if a logic high-to-low (or logic one to zero) transition occurs upon transmitting A(n). Neither enable signal will be generated, despite the assertion of the pre-enable signal, if the conditions for pre-emphasis are not met.

Output circuit 58 includes two output buffers, output buffer 59-1 and output buffer 59-2, in this embodiment. Each of these output buffers is a CMOS (complementary metal oxide semiconductor) output buffer having two transistors. Output buffer 59-1 includes transistors Q1 and Q2, which share a common electrical node between the source of Q1 and the drain of Q2. The common electrical node serves as the output of the output buffer. Similarly, output buffer 59-2 includes transistors Q3 and Q4, and has an output node at the point connecting the source of Q3 to the drain of Q4. The output nodes of output buffers 59-1 and 59-2 are electrically connected to each other, thus giving them a common output.

In the embodiment shown, output buffer 59-1 is configured to drive normal logic signal transmissions (i.e. signal transmissions without pre-emphasis). Output buffer 59-2 is configured to remain idle during normal signal transmissions. If the signal to be transmitted, A(n), is a logic high, the signal may propagate through the inverter shown at the input to output buffer 59-1, becoming a logic low. The logic low signal may then turn on transistor Q1, thereby pulling up the voltage level of the output to a level near the potential of the drain ($V_{DD}$ in this embodiment). If the next signal to be transmitted is a logic low level, a logic high may appear at the input of Q2 (due to the inverter), thereby turning on Q2 and pulling the voltage level at the output to a potential near the source of Q2 ($V_{SS}$ in this embodiment).

During pre-emphasized transmissions, both output buffers 59-1 and 59-2 may be activated. If the next logic signal to be transmitted, A(n), is a logic high, and the p_en signal is asserted, the NAND gate coupled to the gate of Q3 may be forced to a logic low level, thereby turning on Q3. Q1 may be simultaneously turned on when the inverter forces a logic low level onto the transistor gate. Thus, with Q1 and Q3 simultaneously turned on, the voltage level at the common output may be nearer to $V_{DD}$ than it would if only Q1 was turned on. Furthermore, the current level at the common output may be greater than if only Q1 was turned on. Similarly, if A(n) is a logic low level that is to be pre-emphasized, both Q2 and Q4 may be simultaneously turned on during the transmission, pulling the voltage level nearer to $V_{SS}$ than if only Q2 was turned on. The current level drained by both transistors operating simultaneously may be greater than if Q2 was operating alone.

Figure 6B:
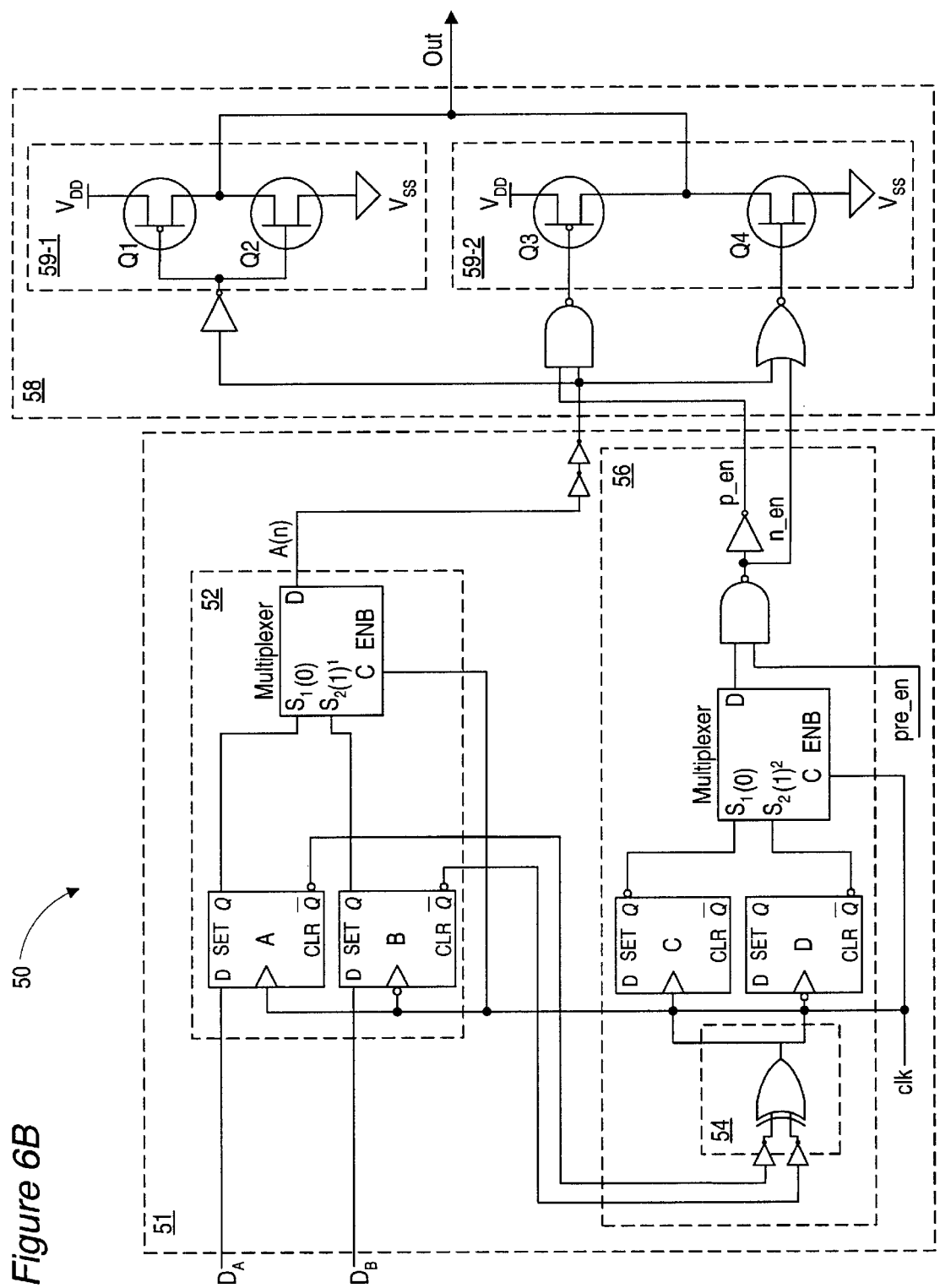
FIG. 6B is a schematic diagram of an alternate embodiment of a driver circuit having selection logic, a pre-emphasis controller, and an output circuit.

FIG. 6B is a schematic diagram of an alternate embodiment of a driver circuit having selection logic, a pre-emphasis controller, and an output circuit. The embodiment of driver circuit 50 shown in FIG. 6B includes selection logic 51, which comprises monitoring circuit 42, comparison circuit 54, and pre-emphasis controller 56. Driver circuit 50 also includes output circuit 58 having output buffers 59-1 and 59-2. Output buffers 59-1 and 59-2 operate in a manner similar to that of the embodiment shown in FIG. 6A, with output buffer 59-1 driving normal signal transmissions, and both output buffers 59-1 and 59-2 operating in conjunction to drive pre-emphasized transmissions.

The embodiment shown in FIG. 6B may be configured for driving logic signals in a system operating at a double date rate (DDR). In a DDR system, both the rising and falling edges of a clock may be utilized for triggering clocked devices. This may allow, for example, a system having a 500 MHz clock to transmit data at one gigabit per second. Driver circuit 50 of FIG. 6B includes four d-type flip-flops, with flip-flops A and C being triggered on rising edge of the clock signal, and flip-flops B and D being triggered on the falling edge of the clock signal. The clock signal may also be coupled to multiplexers 1 and 2. An output from flip-flop A may be allowed to pass through multiplexer 1 during the low portion of the clock cycle, while an output from flip-flop B may pass through during the high portion of the clock signal. Similarly, an output of flip-flop C may pass through multiplexer 2 during the low portion of the clock cycle, while an output from flip-flop D may pass through the multiplexer during the high portion of the clock cycle.

Monitoring circuit 52, as shown in this particular embodiment, may comprise flip-flops A and B, as well as multiplexer 1. Logic signals to be transmitted by driver circuit 50 may be input to the circuit at inputs $D_A$ and $D_B$ in an alternating manner. In one embodiment of operation, a first signal may be input into driver circuit 50 on input $D_A$, while the next input arrives at input $D_B$, a third input arrives at $D_A$, a fourth input at $D_B$, and so on. Logic signals input through $D_A$ may be propagated through the flip-flop A following the next rising edge of the clock signal, and may propagate through multiplexer 1 during the following low portion of the clock signal. Logic signals input through $D_B$ may propagate through flip-flop B following the falling edge of the clock signal, and through multiplexer 1 during the high portion of the clock signal. The output of multiplexer 1 at any given time may be A(n), the next logic signal to be transmitted.

Pre-emphasis controller 56 includes comparison logic 54 in this particular embodiment. Comparison logic 54 comprises two inverters and an exclusive OR gate. Due to the timing of the signals through driver circuit 50, the signals present at the input of comparison logic 54 may represent two previously transmitted logic signals, A(n−2) and A(n−1). If the two signals are of equivalent logic values, it may cause a logic one to propagate through multiplexer 2 to the NAND gate of pre-emphasis controller 56. If the pre-enable signal is asserted when a logic one is received from multiplexer , the output of the NAND gate will be a logic low. In this embodiment, the n_en and p_en signals may be asserted simultaneously (allowing for propagation delay through the inverter). The n_en signal may be asserted as a logic zero (or logic low), while the p_en signal is asserted as a logic one (or logic high). In contrast to the embodiment shown in FIG. 6A, no pre_emphasize signal is present, but rather, the assertion of n_en and p_en indicates that A(n) is to be pre-emphasized upon transmission. If A(n) is a logic high, transistors Q1 and Q3 may turn on simultaneously (allowing for propagation delays), pre-emphasizing the logic high level at which A(n) is transmitted. If A(n) is a logic low, Q2 and Q4 may turn on simultaneously (again allowing for propagation delays), thereby pre-emphasizing the logic low level at which A(n) is transmitted.

Figure 6C:
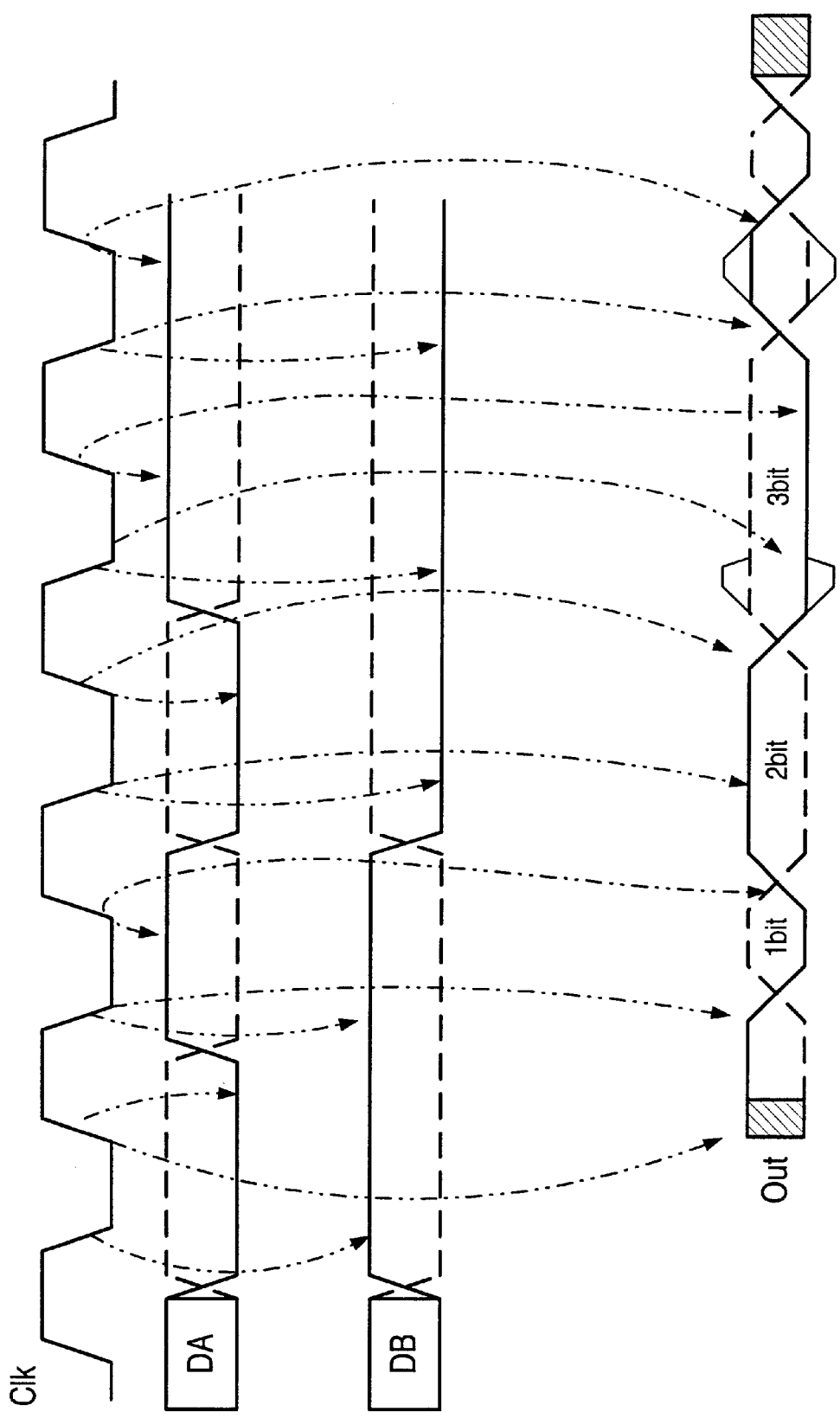
FIG. 6C is a timing diagram illustrating the operation of the circuit in FIG. 6B.

FIG. 6C is a timing diagram illustrating the operation of the circuit in FIG. 6B. As previously noted, the circuit illustrated in FIG. 6B is configured for DDR systems. At the rising edge of the clock cycle, the data input $D_A$ may be latched into flip-flop A. During the high portion of the clock cycle, the output of flip-flop A may propagate through multiplexer 1, and eventually to the output ('out') of the circuit, after some propagation delay. On the falling edge of the clock cycle, the data input $D_B$ may be latched into flip-flop B. During the following low portion of the clock cycle, the data may propagate through multiplexer 1 and to the output of the circuit. Thus, the output of the embodiment of driver circuit 50 shown in FIG. 6B is alternately driven by inputs $D_A$ and $D_B$ on successive high and low portions of the clock cycle, respectively.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for pre-emphasizing a transmitted logic signal, the method comprising:

monitoring logic values of logic signals transmitted by a driver circuit;

comparing a logic value of a next logic signal to a logic value of a first logic signal and a logic value of a second logic signal, wherein the first logic signal is transmitted prior to transmitting the next logic signal, and the second logic signal is transmitted prior to transmitting the first logic signal;

transmitting the next logic signal, wherein the driver circuit is configured to pre-emphasize the next logic signal if the logic value of the first logic signal and the logic value of the second logic signal are equivalent and the logic value of the next logic signal is not equivalent to the logic value of the first logic signal.

2. The method as recited in claim 1 further comprising transmitting the next logic signal, wherein the next logic signal is not pre-emphasized if the logic value of the first logic signal is not equivalent to the logic value of the second logic signal.

3. The method as recited in claim 2, further comprising transmitting the next logic signal, wherein the logic value of the next logic signal is not pre-emphasized if the logic value of the first logic signal is equivalent to the logic value of the next logic signal.

4. The method as recited in claim 1, wherein pre-emphasizing comprises increasing the drive strength of the next logic signal.

5. The method as recited in claim 4, wherein the driver circuit includes an output circuit, the output circuit having a first output buffer and a second output buffer.

6. The method as recited in claim 5 wherein the first output buffer is activated for normal logic signal transmissions, and wherein both the first output buffer and the second output buffer are activated for pre-emphasized logic signal transmissions.

7. The method as recited in claim 6, wherein the driver circuit includes selection logic, wherein the selection logic is configured to perform said monitoring and said comparing.

8. The method as recited in claim 7, wherein the selection logic is configured to activate the second output buffer for pre-emphasized logic signal transmissions.

9. The method as recited in claim 8, wherein the selection logic configures the second output buffer for pre-emphasizing a logic one or pre-emphasizing a logic zero.

10. The method as recited in claim 9, wherein the driver circuit further comprises a pre-emphasis controller configured to receive a pre-enable signal and to generate a first enable signal and a second enable signal.

11. The method as recited in claim 10, wherein the second output buffer is configured to provide pre-emphasis to a logic one signal responsive to an assertion of the first enable signal.

12. The method as recited in claim 10, wherein the second output buffer is configured to provide pre-emphasis to a logic zero signal responsive to an assertion of the second enable signal.

13. The method as recited in claim 10, wherein the second output buffer is inactive and the next logic signal is driven by the first output buffer when the first enable signal is de-asserted and the second enable signal is de-asserted.

14. The method as recited in claim 10, wherein the second output buffer is inactive and all logic signals are driven by the first output buffer when the pre-enable signal is de-asserted.

15. A driver circuit configured for pre-emphasizing a transmitted logic circuit, the driver circuit comprising:

a monitoring circuit, wherein the monitoring circuit is configured monitor logic values of logic signals transmitted by the driver circuit;

a comparison circuit, wherein the comparison circuit is configured to compare a logic value of a next logic signal to a logic value of a first logic signal and a logic value of a second logic signal, wherein the first logic signal is transmitted prior to transmitting the next logic signal, and the second logic signal is transmitted prior to transmitting the first logic signal; and an output circuit, wherein the output circuit is configured to transmit the next logic signal, wherein the next logic signal is pre-emphasized if the logic value of the first logic signal and the logic value of the second logic signal are equivalent and the logic value of the next logic signal is not equivalent to the logic value of the first logic signal.

16. The driver circuit as recited in claim 15, wherein the driver circuit is configured to transmit the next logic signal without pre-emphasis if logic value of the first logic signal Is not equivalent to the logic value of the second logic signal.

17. The driver circuit as recited in claim 16, wherein the driver circuit is configured to transmit the next logic signal without pre-emphasis if the logic value of the first logic signal is equivalent to the value of the next logic signal.

18. The driver circuit as recited in claim 16, wherein the first output buffer is activated for normal logic signal transmissions, and wherein both the first output buffer and the second output buffer are activated for pre-emphasized logic transmissions.

19. The driver circuit as recited in claim 18 further comprising selection logic, the selection logic comprising the monitoring circuit and the comparison circuit.

20. The driver circuit as recited in claim 18, wherein the selection logic is further configured to activate the second output buffer for pre-emphasized logic signal transmissions.

21. The driver circuit as recited in claim 20, further comprising a pre-emphasis controller configured to receive a pre-enable signal and to generate a first enable signal and a second enable signal.

22. The driver circuit as recited in claim 21, wherein the pre-emphasis controller is configured to receive a pre-enable signal and to generate a first enable signal and a second enable signal.

23. The driver circuit as recited in claim 22, wherein the second output buffer is configured to provide pre-emphasis to a logic one signal when the first enable signal is asserted.

24. The driver circuit as recited in claim 22, wherein the second output buffer is configured to provide pre-emphasis to a logic zero signal when the second enable signal is asserted.

25. The driver circuit as recited in claim 22, wherein the second output buffer is inactive and the next logic signal is driven by the first output buffer when the first enable signal is de-asserted and the second enable signal is de-asserted.

26. The driver circuit as recited in claim 22, wherein the second output buffer is inactive and all logic signals are driven by the first output buffer when the pre-enable enable signal is de-asserted.

27. The driver circuit as recited in claim 15, wherein pre-emphasizing comprises increasing the drive strength of the next logic signal.

28. The driver circuit as recited in claim 15, wherein the output circuit includes a first output buffer and a second output buffer.

* * * * *